US011226791B2

(12) United States Patent
Ono et al.

(10) Patent No.: US 11,226,791 B2
(45) Date of Patent: Jan. 18, 2022

(54) ARITHMETIC PROCESSING DEVICE AND METHOD OF CONTROLLING ARITHMETIC PROCESSING DEVICE THAT ENABLES SUPPRESSION OF SIZE OF DEVICE

(71) Applicant: FUJITSU LIMITED, Kawasaki (JP)

(72) Inventors: Takio Ono, Kawasaki (JP); Hiroyuki Wada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 16/590,637

(22) Filed: Oct. 2, 2019

(65) Prior Publication Data
US 2020/0125331 A1 Apr. 23, 2020

(30) Foreign Application Priority Data

Oct. 18, 2018 (JP) .............................. JP2018-196803

(51) Int. Cl.
*G06F 7/544* (2006.01)
*G06F 7/487* (2006.01)
*G06F 9/30* (2018.01)

(52) U.S. Cl.
CPC .......... *G06F 7/5443* (2013.01); *G06F 7/4876* (2013.01); *G06F 9/30014* (2013.01)

(58) Field of Classification Search
CPC ... G06F 7/3875; G06F 7/5443; G06F 9/30014
See application file for complete search history.

(56) References Cited

U.S. PATENT DOCUMENTS

| 5,517,438 | A | * | 5/1996 | Dao-Trong | ........... | G06F 7/5443 |
| | | | | | | 708/501 |
| 5,574,672 | A | * | 11/1996 | Briggs | ...................... | G06F 7/57 |
| | | | | | | 708/209 |
| 5,748,516 | A | * | 5/1998 | Goddard | ................. | G06F 7/483 |
| | | | | | | 708/497 |
| 5,999,960 | A | * | 12/1999 | Gerwig | ..................... | G06F 5/01 |
| | | | | | | 708/500 |

(Continued)

FOREIGN PATENT DOCUMENTS

| JP | 2009-140491 A | 6/2009 |
| JP | 2014-93085 A | 5/2014 |

OTHER PUBLICATIONS

EESR—Extended European Search Report of European Patent Application No. 19201747.3 dated Mar. 3, 2020.

*Primary Examiner* — Michael D. Yaary
(74) *Attorney, Agent, or Firm* — Fujitsu Patent Center

(57) ABSTRACT

An arithmetic processing device has, when any or both of a first operand and a second operand included in a multiply-add operation instruction is or are zero, an exponent setting circuit sets an exponent of the first operand to a first set value, and sets an exponent of the second operand to a second set value. An exponent calculation circuit calculates an exponent obtained by a multiply-add operation, based on the exponents of the first and second operands outputted by the exponent setting circuit and an exponent of a third operand included in the multiply-add operation instruction. The sum of the first set value and the second set value is set so that a bit position of the third operand is located on a higher-order bit side than the most significant bit of the sum of the first operand and the second operand.

10 Claims, 12 Drawing Sheets

(56) References Cited

U.S. PATENT DOCUMENTS

| | | | |
|---|---|---|---|
| 6,298,367 B1 * | 10/2001 | Oberman | G06F 7/483 708/495 |
| 2004/0186870 A1 | 9/2004 | Dhong et al. | |
| 2009/0150654 A1 | 6/2009 | Oberman et al. | |
| 2010/0017635 A1 | 1/2010 | Barowski et al. | |
| 2014/0122554 A1 | 5/2014 | Hickmann et al. | |
| 2014/0122555 A1 | 5/2014 | Hickmann et al. | |
| 2015/0193203 A1 | 7/2015 | Iyer et al. | |

* cited by examiner

ARITHMETIC PROCESSING DEVICE AND METHOD OF CONTROLLING ARITHMETIC PROCESSING DEVICE THAT ENABLES SUPPRESSION OF SIZE OF DEVICE

CROSS-REFERENCE TO RELATED APPLICATION

This application is based upon and claims the benefit of priority of the prior Japanese Patent Application No. 2018-196803, filed on Oct. 18, 2018, the entire contents of which are incorporated herein by reference.

FIELD

The embodiments discussed herein are related to an arithmetic processing device and a method of controlling the arithmetic processing device.

BACKGROUND

For a multiply-add computing unit included in an arithmetic processing device, a method has been proposed in which if one of operands to be multiplied is zero, an operand to be added to the multiplication result is caused to bypass the multiply-add operation and is directly used as a result of the multiply-add operation (Japanese Laid-open Patent Publication No. 2014-93085, for example). In addition, for the multiply-add computing unit, another method has been proposed in which, if an operand to be inputted represents a special number such as an unnormalized number, a not-a-number, infinity, or zero, the operand is propagated to various circuit blocks, using a bypass circuit (Japanese Laid-open Patent publication No. 2009-140491, for example).

SUMMARY

According to an aspect of the embodiments, an arithmetic processing device includes: a zero detection circuit that detects that at least one of a first operand and a second operand included in a multiply-add operation instruction is zero; an exponent setting circuit that sets an exponent of the first operand to a first set value and sets an exponent of the second operand to a second set value, when the zero detection circuit detects the zero; an exponent calculation circuit that calculates an exponent to be obtained by a multiply-add operation, based on the exponent of the first operand and the exponent of the second operand outputted by the exponent setting circuit and an exponent of a third operand included in the multiply-add operation instruction; a multiplication circuit that calculates a product of a significand of the first operand and a significand of the second operand; and an addition circuit that adds the product calculated by the multiplication circuit and a significand of the third operand that is aligned, a sum of the first set value and the second set value being set so that a bit position of the third operand is located on a higher-order bit side than a most significant bit of the product of the first operand and the second operand.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

For example, if a path bypassed by an operand to be added to a multiplication result is provided in a multiply-add computing unit, the circuit size of the multiply-add computing unit increases disadvantageously. For example, in the case of a floating point multiply-add computing unit, bypass paths are provided respectively for both the exponent and the significand of an operand to be added to the multiplication result. In addition, a selector that selects either a normal path through which an operation result of a multiply-add operation is conveyed or the bypass path is provided for each of the exponent and the significand.

In the following, description is given using the drawings.

Figure 1:
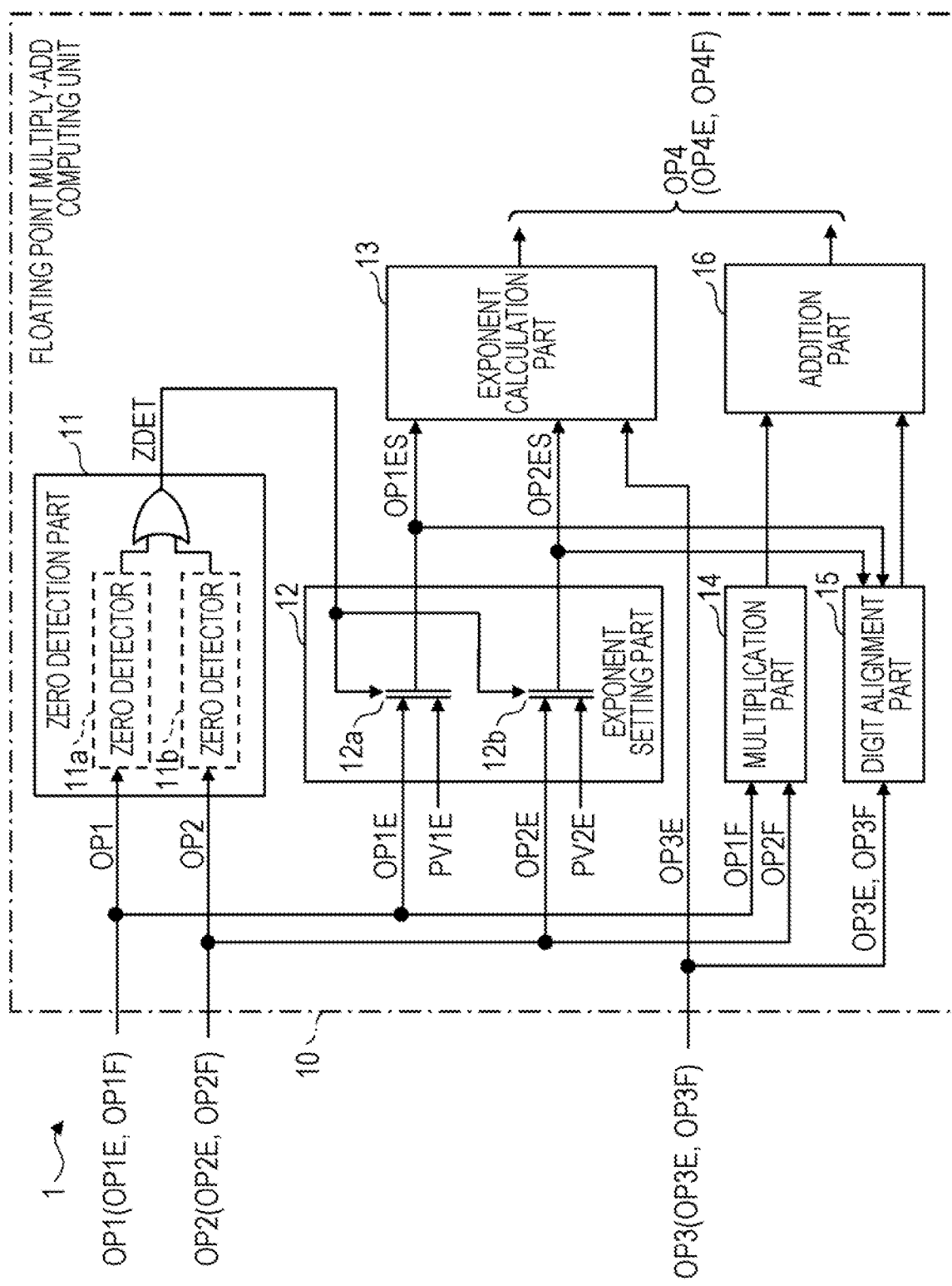
FIG. 1 is a view of an example of an arithmetic processing device in an embodiment.

FIG. 1 illustrates an example of an arithmetic processing device in an embodiment. An arithmetic processing device 1 illustrated in FIG. 1 includes a floating point multiply-add computing unit 10. The arithmetic processing device 1 may be a central processing unit (CPU) of a scalar or super-scalar system, a graphics processing unit (GPU), or a processor used in deep learning.

The arithmetic processing device 1 may have an instruction buffer that stores an instruction to be executed by the floating point multiply-add computing unit 10, a register that retains data to be used in the execution of the instruction, or the like. The arithmetic processing device 1 may also have a plurality of floating point multiply-add computing units 10 that executes a plurality of multiply-add operations in parallel. In the following, the floating point multiply-add computing unit 10 is also simply referred to as a multiply-add computing unit 10. The multiply-add computing unit 10 includes circuits. The circuit of the multiply-add computing unit 10 may include a programmable logic device such as a field-programmable gate array (FPGA), or the like.

The multiply-add computing unit 10 receives floating-point numbers OP1, OP2, and OP3 specified by an operand of a multiply-add operation instruction. As illustrated in expression (1), the multiply-add computing unit 10 calculates the product of the floating-point numbers OP1 and OP2, adds a floating-point number OP3 to the calculated product, and outputs the calculated product as a floating-point number OP4.

$$OP4=OP1*OP2+OP3 \quad (1)$$

For example, the floating-point numbers OP1, OP2, and OP3 are input operands, and the floating-point number OP4 is an output operand. In expression (1), a symbol "*" represents a multiplication.

The floating-point number OP1 includes an exponent OP1E and a significand OP1F, and the floating-point number OP2 includes an exponent OP2E and a significand OP2F. The floating-point number OP3 includes an exponent OP3E and a significand OP3F, and the floating-point number OP4 includes an exponent OP4E and a significand OP4F. Note that although the floating-point numbers OP1, OP2, OP3, and OP4 have signs, the floating-point numbers OP1, OP2, OP3, and OP4 in the following description are zero or higher, and description of the signs and operations of circuits related to the signs are omitted. In the following, the floating-point numbers OP1, OP2, OP3, and OP4 are also referred to as operands OP1, OP2, OP3, and OP4, respectively.

The multiply-add computing unit 10 includes a zero detection part 11, an exponent setting part 12, an exponent calculation part 13, a multiplication part 14, an alignment part 15, and an addition part 16.

The zero detection part 11 has a zero detector 11a that detects whether or not the operand OP1 is zero, and a zero detector 11b that detects whether or not the operand OP2 is zero. If one or both of the zero detectors 11a, 11b detects/detect zero, the zero detection part 11 outputs a zero detection signal ZDET to the exponent setting part 12. For example, the zero detection part 11 outputs OR logic of a detection result of the zero detector 11a, 11b as the zero detection signal ZDET. The OR logic may be positive logic or negative logic.

The exponent setting part 12 has selectors 12a, 12b. If the zero detection signal ZDET indicates detection of zero, the selector 12a selects a set value PV1E that is set in advance, and outputs, as an exponent OP1ES, the selected set value PV1E to the exponent calculation art 13 and the alignment part 15. If the zero detection signal ZDET does not indicate the detection of zero (if the zero detection signal ZDET indicates detection of non-zero), the selector 12a selects the exponent OP1E of the operand OP1 and outputs, as the exponent ONES, the selected exponent. OP1E to the exponent calculation part 13 and the alignment part 15.

If the zero detection signal ZDET indicates the detection of zero, the selector 12b selects a set value PV2E that is set in advance, and outputs, as an exponent OP2ES, the selected set value PV2E to the exponent calculation part 13 and the alignment part 15. If the zero detection signal ZDET does not indicate the detection of zero (if the zero detection signal ZDET indicates detection of non-zero), the selector 12b selects the exponent OP2E of the operand OP2 and outputs, as the exponent OP2ES, the selected exponent OP2E to the exponent calculation part 13 and the alignment part 15. More specifically, if the zero detection part 11 detects zero, the exponent setting part 12 sets the exponent. OP1ES to the set value PV1E and sets the exponent OP2ES to the set value PV2E.

Here, the sum of the set values PV1E and PV2E is set so that a bit position of the operand OP3 is located on a higher-order bit side than the most significant bit of the product of the operands OP1 and OP2. The sum of the set values PV1E and PV2E corresponds to an exponent of the product of the operands OP1 and OP2. For example, the set values PV1E and PV2E are set to a minimum value that the exponents OP1E and OP2E may take. This makes it possible to make a value of the operand OP4 obtained from the multiply-add operation a value of the operand OP3, if one or both of the operands OP1 and OP2 is or are zero.

In other words, the value of the operand OP4 may be set to the value of the operand OP3 without provision of a bypass path for outputting the operand OP3 as the operand OP4. In addition, although the multiply-add computing unit 10 illustrated in FIG. 1 includes the selectors 12a and 12b for the exponents OP1E and OP2E, the multiply-add computing unit 10 does not include any selector for the significands OP1F and OP2F. Normally, the number of bits of a significand is larger than the number of bits of an exponent. As a result, as compared to a case in which the bypass circuit is provided, an increase of circuit size of the multiply-add computing unit 10 may be suppressed.

The exponent calculation part 13 calculates the exponent OP4E of the operand OP4 that is obtained by the multiply-add operation, based on the exponent OP1ES (OP1E or PV1E), the exponent. OP2ES (OP2E or PV2E), and the exponent OP3E of the operand OP3. Note that the exponent OP4E calculated by the exponent calculation part 13 may be corrected based on an addition result of the significand OP1F, OP2F, and OP3F by the addition part 16.

The multiplication part 14 calculates a product OP4F*OP2F of the significand OP1F of the operand OP1 and the significand OP2F of the operand OP2. Note that the symbol "*" represents a product. The alignment part 15 calculates a shift amount by subtracting the exponent OP3E from the sum of the exponents OP1ES and OP2ES, the shift amount being for aligning the digits of the significand OP3F with the digits of the product OP1F*OP2F.

The addition part 16 adds the significand OP3F of the aligned operand OP3 to the product OP1F*OP2F calculated by the multiplication part 14, and calculates the significand OP4F of the operand OP4 obtained by the multiply-add operation. Then, the multiply-add computing unit 10 outputs a result of the multiply-add operation OP1*OP2+OP3 as the operand OP4. For example, the operand OP4 is stored in a register.

Figure 2:
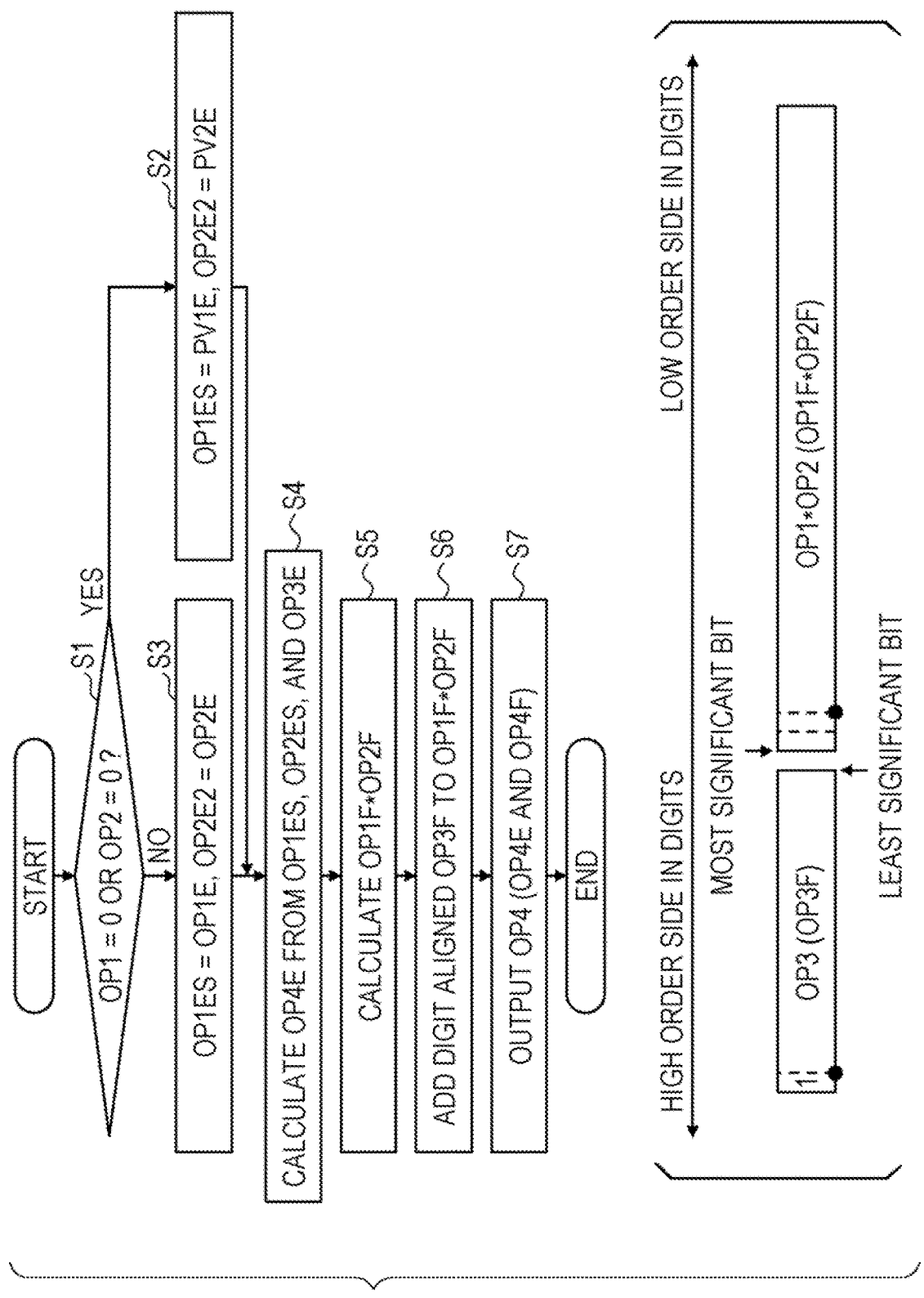
FIG. 2 is a view of an example of an operation of the arithmetic processing device in FIG. 1.

FIG. 2 illustrates an example of an operation of the arithmetic processing device 1 in FIG. 1. More specifically, FIG. 2 illustrates an example of a method of controlling the arithmetic processing device 1. An operation illustrated in FIG. 2 is started based on issuance of a multiply-add operation instruction of a floating-point number to the multiply-add computing unit 10.

First, in step S1, the zero detection part 11 detects whether or not the operand OP1 is zero, and whether or not the operand OP2 is zero. If one or both of the operands OP1 and OP1 is or are zero, the multiply-add computing unit 10 advances the operation to step S2. If neither the operand OP1 nor OP1 is zero, the multiply-add computing unit 10 advances the operation to step S3.

In step S2, the exponent setting part 12 selects the set value PV1E, instead of the exponent OP1E, and outputs the set value PV1E to the exponent calculation part 13 as the exponent ONES. In addition, the multiply-add computing unit 10 selects the set value PV2E instead of the exponent OP2E, and outputs the set value PV2E to the exponent calculation part 13 as the exponent OP2ES. After step S2, the operation is advanced to step S4. In step S3, the exponent setting part 12 selects the exponents OP1E and OP2E, outputs the exponents OP1E and OP2E as the exponents OP1ES and OP2ES to the exponent calculation part 13, and advances the operation to step S4.

In step S4, the exponent calculation part 13 calculates the exponent OP4E based on the exponents OP1ES and OP2ES received from the exponent setting part 12, and the exponent OP3E of the operand OP3, and advances the operation to step S5. Note that the exponent OP4E may be corrected in step S7.

In step S5, the multiplication part 14 calculates the product OP1F*OP2F of the significands OP1F and OP2F, and advances the operation to step S6. Note that step S5 may be started prior to step S4. In step S6, the addition part 16 calculates the significand OP4F, which is a result of the multiply-add operation of the significand, by adding the significand OP3F of the aligned operand OP3 to the product OP1F*OP2F calculated by the multiplication part 14, and advances the operation to step S7. Note that the alignment of the significand OP3F used by the addition part 16 is performed by the alignment part 15.

In step S7, the multiply-add computing unit 10 performs normalization processing, rounding processing, and the like of the significand OP4F calculated by the addition part 16, for example, and corrects the significand OP4F, which is the result of the multiply-add operation of the significand. In addition, the multiply-add computing unit 10 corrects the exponent OP4E calculated by the exponent calculation part 13, based on a result of the normalization processing and a result of the rounding processing. Then, the result of the multiply-add operation is outputted as the operand OP4 (OP4E and OP4F).

The part in the square bracket in FIG. 2 depicts a positional relation of size of the product OP1*OP2 of the operands OP1 and OP2, and the operand OP3. A horizontal axis represents digits, and the left side of FIG. 2 represents a higher-order side. For example, the operand OP3 represents the significand OP3F, and the product OP1*OP2 represents the product of the significands OP1F*OP2F.

The part in the square bracket in FIG. 2 depicts a notation in a binary number, and a filled circle in lower left under each value represents a position of a decimal point. For example, if the integer parts of the significand OP3F and the significands OP1F and OP2F, which are not illustrated, are expressed by one digit, the integer part of the product OP1*OP2 is expressed by at least two digits (first and second places of the integer part). Although not especially limited, the significands OP1F, OP2F, and OP3F are 24 bits and the product of the significands OP1F*OP2F is 48 bits.

If the most significant bit of the product OP1*OP2 is located on a lower-order bit side than the least significant bit of the operand OP3 and one or both of the operands OP1 and OP2 is or are zero, the product of the significands OP1F*OP2F is zero. Thus, the significand OP4F of the result of the multiply-add operation is equal to the significand OP3F. On the other hand, if the most significant bit of the product OP1*OP2 is located on the lower order bit side than the least significant bit of the operand OP3 and the operands OP1 and OP2 are not zero, a carry into the significand OP3F may be produced depending on how the product OP1*OP2 is rounded. Consequently, the significand OP4F is not necessarily equal to the significand OP3F.

In this embodiment, the sum of the set values PV1E and PV2E is set so that the most significant bit of the product OP1*OP2 is located on the lower-order bit side than the least significant bit of the operand OP3. This makes it possible to output the operand OP3 as the operand OP4, without provision of the bypass circuit and the selector of the exponent OP3E and the significand OP3F in the multiply-add computing unit 10, if either or both of the operands OP1 or OP2 is or are zero. More specifically, if it is detected that either or both of the operands OP1 or OP2 is or are zero, and the operand OP3 is outputted as the operand OP4, the increase of the circuit size of the multiply-add computing unit 10 may be suppressed.

Note that the addition part 16 may include in the operation result a predetermined number of additional bits that are appended in lower order than the least significant bit of the product OP1F*OP2F or the significand OP3F. In this case, the sum of the set values PV1E and PV2E may be set so that the least significant bit of the additional bits to be appended to the significand OP3F is located at the same position as the most significant bit of the product of the significands OP1F and OP2F or on a higher-order bit side than the most significant bit.

As described above, in the embodiment illustrated in FIGS. 1 and 2, if it is detected that any or both of the operands OP1 and OP2 is or are zero, and the operand OP3 is outputted to the operand OP4, the increase of the circuit size of the multiply-add computing unit 10 may be suppressed.

Figure 3:
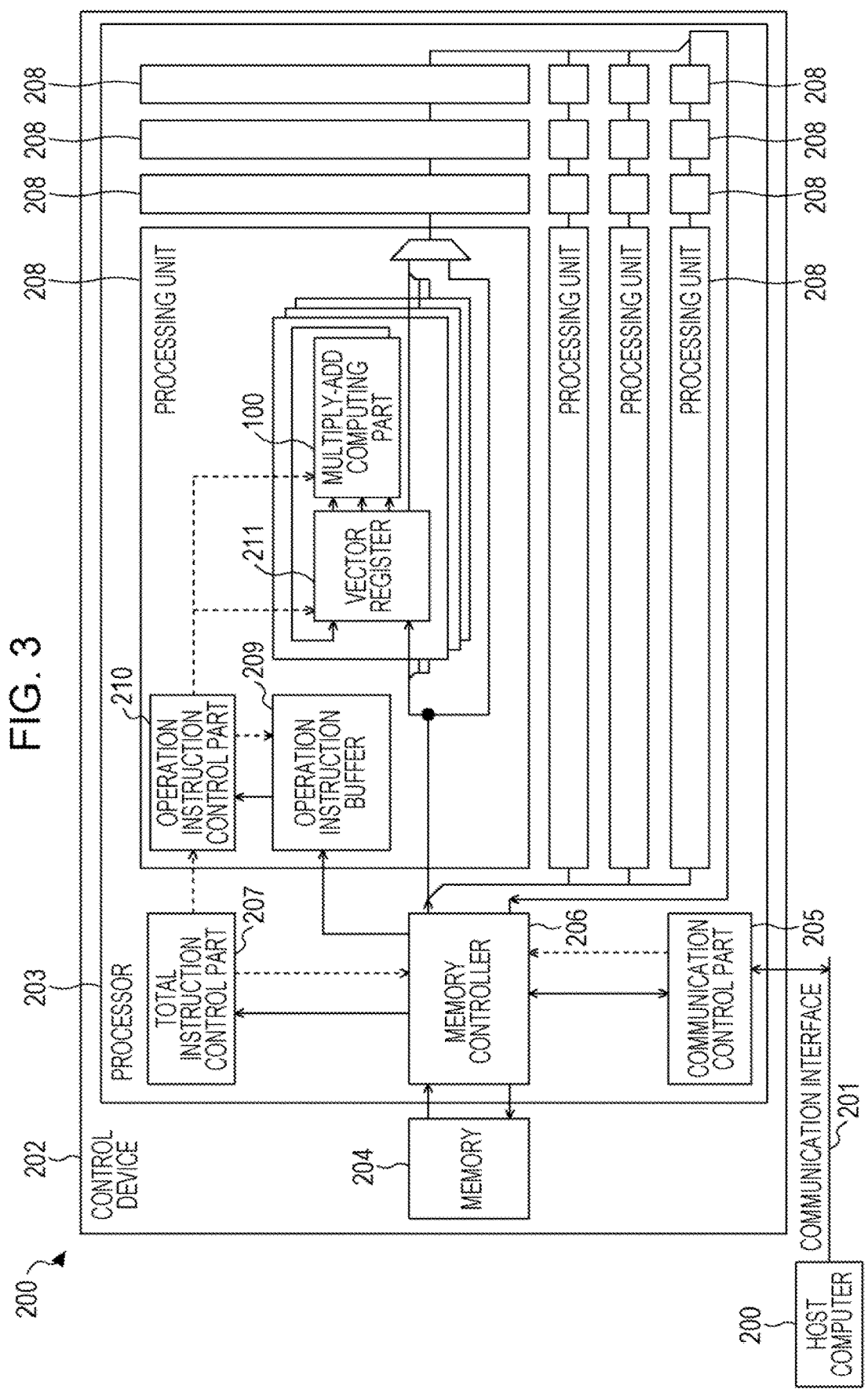
FIG. 3 is a view of an example of an information processor including an arithmetic processing device in another embodiment.

FIG. 3 illustrates an example of an information processor including an arithmetic processing device in another embodiment. Detailed description of elements and functions similar to the elements and the functions described in FIGS. 1 and 2 is omitted. In FIG. 3, solid-line arrows depict signal lines through which an operation instruction or data is transferred, and dashed-line arrows depict signal lines through which various types of directions such as a control signal are transferred.

An information processor 300 illustrated in FIG. 3 is, for example, a server, and includes a host computer 200 and a controller 202 coupled to the host computer 200 via a communication interface 201. For example, the communication interface 201 is a peripheral component interconnect (PCI) bus, and the controller 202 is a PCI card to be placed into a PCI slot of the host computer 200. Note that the controller 202 may be included in the host computer 200. The host computer 200 controls a processor 203 on the controller 202, through the communication interface 201.

The controller 202 has the processor 203 and a memory 204. The memory 204 is a memory module on which a plurality of memory chips is stacked, for example. The memory 204 retains an operation instruction string that causes the processor 203 to execute and a control instruction string that controls operation data and operation of the processor 203, and stores the operation result.

The processor 203 has a communication control part 205, a memory controller 206, a total instruction control part 207, and a plurality of processing units 208. For example, the processor 203 is a processor used for deep learning, and is an example of the arithmetic processing device. Note that in FIG. 3, although the processor 203 has the 16 processing units 208, the number of the processing units 208 is not limited to 16. In addition, the controller 202 may have a plurality of processors 203.

The communication control part 205 controls transfer of an instruction string, data, and control information between the host computer 200 and the processor 203. The memory controller 206 operates based on a direction from the total instruction control part 207 and the communication control part 205. The memory controller 206 controls transfer of the instruction string and the data between the host computer 200 and the memory 204, between the total instruction control part 207 and the memory 204, and between each of the processing units 208 and the memory 204.

The total instruction control part 207 controls the operation of the entire processor 203 based on a direction received from the host computer 200 via the communication control part 205, and outputs to the host computer 200 a response such as end of the arithmetic processing by the processor 203.

Each of the processing units 208 has an operation instruction buffer 209, an operation instruction control part 210, a plurality of vector registers 211, and a plurality of multiply-add computing units 100. For example, the multiply-add computing unit 100 is a single-precision (32 bits) floating point multiply-add computing unit. Note that the multiply-add computing unit 100 may be a half-precision (16 bits) or double-precision (64 bits) floating point multiply-add computing unit. The processing units 208, although not especially limited, may include several hundreds to several thousands of multiply-add computing units 100. In addition, each of the processing units 208 may also include an adder, a logic computing unit, a multiplier, a divider, or the like, in addition to the multiply-add computing unit 100.

The operation instruction buffer 209 retains the operation instruction read from the memory 204 via the memory controller 206, and outputs the retained operation instruction to the operation instruction control part 210 based on a direction from the operation instruction control part 210. The operation instruction control part 210 controls the vector register 211 and the multiply-add computing unit 100 based on the operation instruction received from the operation instruction buffer 209.

The vector register 211 retrains data for operation read from the memory 204 via the memory controller 206, and retains the operation result of the multiply-add operation executed by the multiply-add computing unit 100. The multiply-add computing unit 100 executes the multiply-add operation using the data retrieved from the vector register 211 and stores the operation result in the vector register 211.

In the following, an overview is given of the operation of multiply-add arithmetic processing by the information processor 300. When performing the multiply-add arithmetic processing, the host computer 200 stores the control instruction string, the operation instruction string, and the operation data in the memory 204 via the communication control part 205 and the memory controller 206. Then, the host computer 200 directs the total instruction control part 207 via communication control part 205 to read and execute the control instruction string retained in the memory 204.

Based on the direction from the host computer 200, the total instruction control part 207 controls the memory controller 206 and retrieves the control instruction string from the memory 204. Then, the total instruction control part 207 issues to the memory controller 206 a direction to read the operation instruction string and the operation data from the memory 204, according to each instruction of the retrieved control instruction string.

Based on the direction from the total instruction control part 207, the memory controller 206 reads the operation instruction and the operation data from the memory 204 and stores the operation instruction in the operation instruction buffer 209 of the processing unit 208 that executes the operation. The memory controller 206 also stores the read operation data in each of the vector registers 211 of the processing unit 208 that executes the operation.

After this, the total instruction control part 207 directs the operation instruction control part 210 of the processing unit 208 that executes the operation to start the operation. The operation instruction control part 210 that receives the direction retrieves the operation instruction from the operation instruction buffer 209, controls the vector register 211 and the multiply-add computing unit 100, and executes the multiply-add operation. For example, the operation instruction control part 210 issues to the vector register 211 a direction to read the data and a direction to write the operation result transferred from the multiply-add computing unit 100. In addition, the operation instruction control part 210 issues to the multiply-add computing unit 100 a direction to execute the operation using the data read from the vector register 211 and a direction to output the operation result to the vector register 211.

Based on the direction from the total instruction control part 207, the vector register 211 outputs the data to be used in the operation to the multiply-add computing unit 100, and the multiply-add computing unit 100 executes the operation and outputs the operation result to the vector register 211. Based on end of the operation, each operation instruction control part 210 notifies the total instruction control part 207 of the end of the operation. The total instruction control part 207 directs each operation instruction control part 210 and the memory controller 206 to write the operation result to the memory 204. The operation instruction control part 210 directs the vector register 211 to read the operation result and transfer the read operation result to the memory controller 206. The memory controller 206 writes the operation result transmitted from each of the processing units 208 to the memory 204.

Based on completion of the writing of the operation result to the memory 204, the total instruction control part 207 reports the completion of the arithmetic processing to the host computer 200. Based on the report of the completion of the arithmetic processing, the host computer 200 directs, via the communication control part 205 and the memory controller 206, transfer to the host computer 200 of the operation result retained by the memory 204, and collects the operation result.

Figure 4:
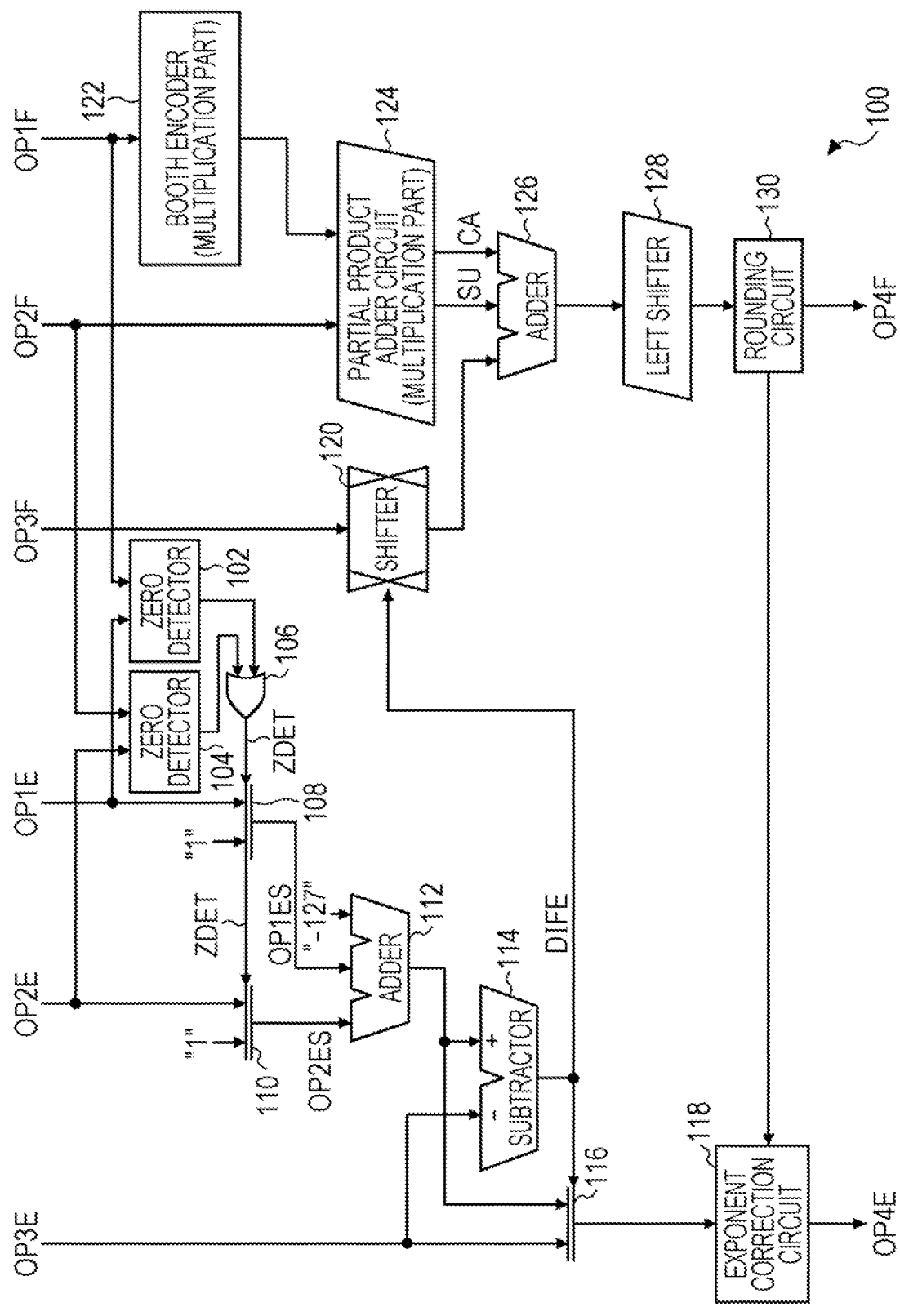
FIG. 4 is a view of an example of a multiply-add computing unit in FIG. 3.

FIG. 4 illustrates an example of the multiply-add computing unit 100 of FIG. 3. The multiply-add computing unit 100 has zero detectors 102, 104, an OR gate 106, selectors 108 and 110, an adder 112, a subtracter 114, a selector 116, and an exponent correction circuit 118. In addition, the multiply-add computing unit 100 also has a shifter 120, a booth encoder 122, a partial product adder circuit 124, an adder 126, a left shifter 128 and a rounding circuit 130.

For example, the multiply-add computing unit 100 adopts the Institute of Electrical and Electronics Engineers (IEEE) 754 (IEEE Standard for Floating-Point Arithmetic). In a binary floating-point format of IEEE 754, the single-precision (32 bits) floating-point number includes a 1-bit sign, an 8-bit exponent, and a 23-bit significand. Note that in FIG. 4, for simplicity of description, the input operands OP1, OP2, and OP3 are supposed to be zero or higher, and description of circuits to be used in calculation of signs is omitted.

The zero detector 102 detects whether or not the operand OP1 is zero, based on the exponent OP1E and the significand OP1F. The zero detector 102 outputs logic 1 if the operand OP1 is zero, or outputs logic 0 if the operand OP1 is non-zero. The zero detector 104 detects whether or not the operand OP2 is zero based on the exponent OP2E and the significand OP2F. The zero detector 104 outputs the logic 1 if the operand OP2 is zero, and outputs the logic 0 if the operand OP2 is non-zero.

For example, if the exponents OP1E and OP1F are both zero, the zero detector 102 detects zero of the operand OP1. If the operands OP2E and OP2F are both zero, the zero detector 104 detects zero of the operand OP2. The zero detectors 102, 104 are each an example of the zero detection part.

The OR gate 106 OR-operates output of the zero detectors 102 and 104 and outputs the operation result to the selectors 108 and 110 as the zero detection signal ZDET. More specifically, if one or both of the operands OP1 and OP2 is or are zero, the OR gate 106 outputs the zero detection signal ZDET of the logic 1. If neither the operand OP1 nor OP2 is zero, the OR gate 106 outputs the zero detection signal ZDET of the logic 0. Note that the logic that the zero detectors 102, 104 outputs when zero is detected may be "0", and in this case, the OR gate 106 of negative logic (NAND gate, for example) is used.

If the selector 108 receives the zero detection signal ZDET of the logic 0, the selector 108 selects the exponent ONE and outputs the exponent ONE as the exponent. OP1ES. If the selector 108 receives the zero detection signal ZDET of the logic 1, the selector 108 selects "1" and outputs "1" as the exponent OP1ES. If the selector 110 receives the zero detection signal ZDET of the logic 0, the selector 110 selects the exponent OP2E and outputs the exponent OP2E as the exponent OP2ES. If the selector 110 receives the zero detection signal ZDET of the logic 1, the selector 110 selects "1" and outputs "1" as the exponent OP2ES. The OR gate 106 and the selectors 108 and 110 are each an example of the exponent setting part. In addition, the selector 108 is an example of a first selection part, and a selector 110 is an example of a second selection part, "1" selected by the selector 108 is an example of the first set value, and "1" selected by the selector 110 is an example of the second set value.

The adder 112 adds up the exponents OP1ES and OP2ES outputted from the selectors 108 and 110, subtracts a bias "127" from the added value, and calculates exponents in the case where the operands OP1 and OP2 are multiplied. The adder 112 outputs the calculated exponents to the subtracter 114 and the selector 116. Note that if the multiply-add computing unit 100 is of half precision (16 bits), the bias "15" is subtracted from the added value. If the multiply-add computing unit 100 is of double precision (64 bits), the bias "1023" is subtracted from the added value.

The subtracter 114 subtracts the operand OP3E of the operand OP3 from the exponent outputted from the adder 112, calculates a difference DIFE between the exponent if the operands OP1 and OP2 are multiplied and the exponent OP3E, and outputs the calculated difference DIFE to the selector 116 and the shifter 120.

If the difference DIFE is 0 or larger, the selector 116 selects an exponent to be outputted from the added value. If the difference DIFE is negative, the selector 116 selects the exponent OP3E of the operand OP3 and outputs the selected exponent to the exponent correction circuit 118. More specifically, the selector 116 selects a larger exponent of the exponent outputted from the adder 112 and the exponent OP3E. The adder 112, the subtracter 114, and the selector 116 are each an example of the exponent calculation part. In addition, the selector 116 is an example of a third selection part.

Based on the difference DIFE outputted from the subtracter 114, the shifter 120 shifts the bits of the significand OP3F. If the difference DIFE outputted from the subtracter 114 is a positive value, because the exponent OP3E is smaller than the exponent of the multiplication result of the operands OP1 and OP2 or "2", the shifter 120 right-shifts the bits of the significand OP3F based on the difference DIFE.

If the difference DIFE outputted from the subtracter 114 is a negative value, the exponent OP3E is larger than the exponent of the multiplication result of the operands OP1 and OP2 or "2". For this reason, the shifter 120 left-shifts the bits of the significand OP3F based on the difference DIFE. This aligns a position of the decimal point of the operand OP3 with a position of the decimal point of the multiplication result of the significands OP1F*OP2F. Note that the shift amount of the shifter 120 is limited so that the position of the decimal point of the significand OP3F of the operand 3 does not protrude from the bit width of the adder 126.

The booth encoder 122 and the partial product adder circuit 124 operate as a multiplication part that calculates the product of the significand OP1F, a multiplicator and the significand OP2F, a multiplicand. The booth encoder 122 generates a control value for every predetermined number of bits of the significand OP1F according to a bit value, the control value being for calculating a partial product of the significands OP1F and OP2F, and outputs the generated control value to the partial product adder circuit 124.

The partial product adder circuit 124 calculates, for every predetermined number of bits (partial bits) of the significand OP2F, M times of the partial bits (M is 0, 1, 2, −1, or −2, for example) as a partial product based on the control value, and calculates the product of the significands OP1F and OP2F by adding up the calculated partial products. The partial product adder circuit 124 outputs the calculated product as a sum SU and a carry CA.

The adder 126 adds up the product (sum SU and carry CA) outputted from the partial product adder circuit 124 and the significand OP3F aligned by the shifter 120, and outputs the addition result to the shifter 128. The adder 126 is an example of the addition part.

The left shifter 128 normalizes the addition result of the significand outputted from the adder in such a way that "1" that appears first on the higher-order side in a bit sequence of the operation result of the significand is shifted to the higher-order side. The left shifter 128 outputs the normalized addition result (significand) and a shift value representing the shifted number to the rounding circuit. For example, the shift value of the left shifter 128 for normalizing the significand is calculated from a leading zero counter which is not illustrated.

The rounding circuit 130 performs the rounding processing of the normalized significand outputted from the left shifter 128, outputs, as the significand OP4F of the operand OP4, the value of the significand on which the rounding processing is performed, and the shift value outputted from the left shifter 128 to the exponent correction circuit 118. In addition, if a carry occurs, the rounding circuit 130 outputs carry information indicating the carry to the exponent correction circuit 118.

The exponent correction circuit 118 corrects (normalization processing) the exponent by subtracting the shift value outputted from the rounding circuit 130 from the operation result of the exponent outputted from the selector 116, and outputs a correction result as the exponent OP4F of the operand OP4.

Figure 5:
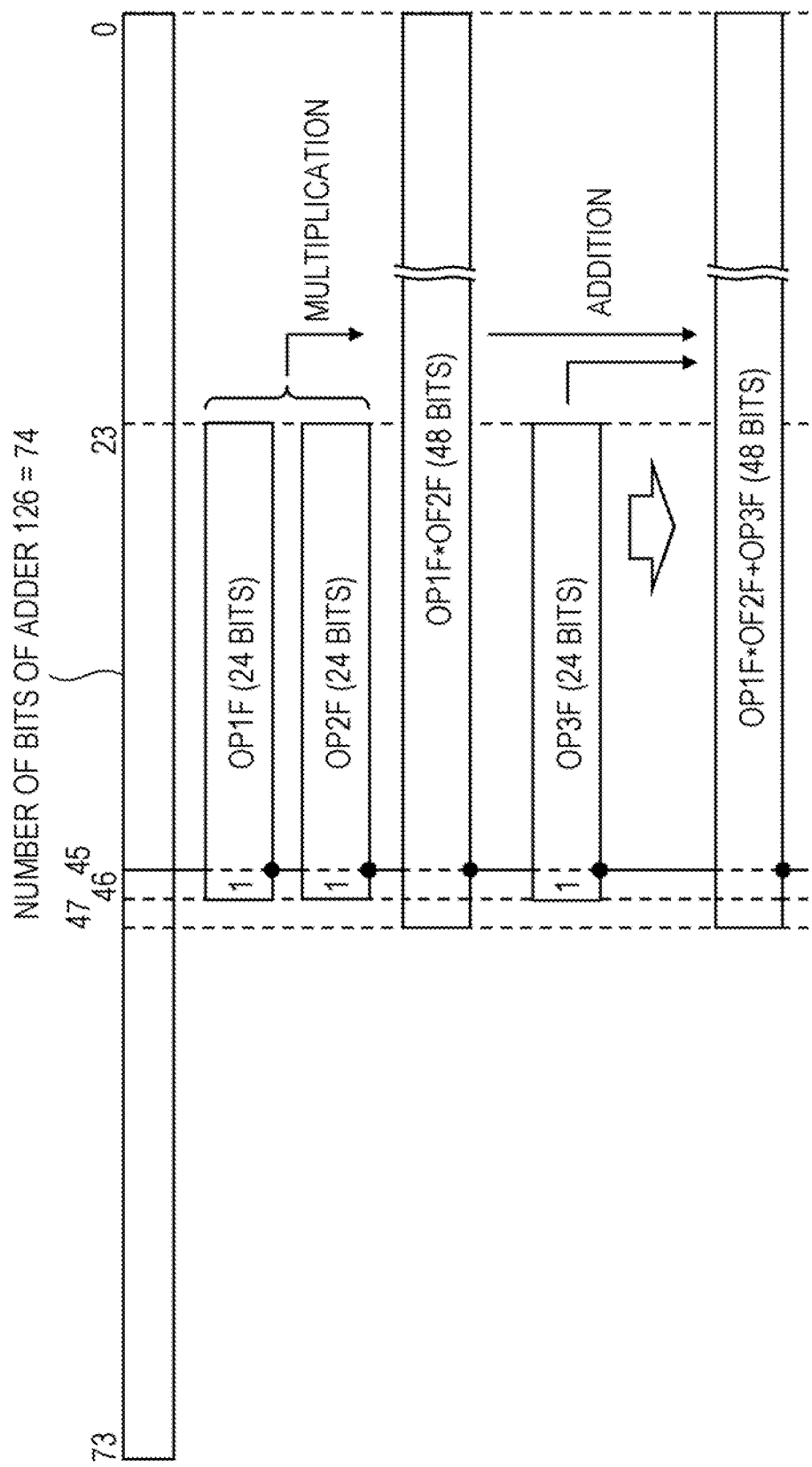
FIG. 5 is a view of an example of a multiply-add operation by the multiply-add computing unit in FIG. 4.

FIG. 5 illustrates an example of a multiply-add operation by the multiply-add computing unit 100 of FIG. 4. In the case where the multiply-add computing unit 100 is of single precision, the adder 126 has a width of 74 bits. In the case of the single precision, the significands OP1F, OP2F, and OP3F including a hidden bit "1" have 24 bits, and the product OP1F*OP2F has 48 bits. Consequently, the position of the decimal point (filled circle) is set between the 46th bit and the 45th bit so that the product OP1F*OP2F fits in the bit width of the adder 126.

In FIG. 5, the position of the decimal point of the operand OP3 is the same as the position of the decimal point of the product OP1F*OP2F of the significands OP1F and OP2F. Thus, the adder 126 adds up the product OP1F*OP2F of the significands OP1F and OP2F and the significand OP3F, and calculates a multiply-add operation result of the significand OP1F*OP2F+OP3F. In addition, if the adder 126 generates the significand OP4F (24 bits) from the multiply-add operation result (OP1F*OP2F+OP3F), the adder 126 appends a guard bit G, a round bit R, and a sticky bit S on the lower-order side than the least significant bit of the significand OP4F. The guard bit G, the round bit R, and the sticky bit S are each an example of an additional bit located in the lower order than the least significant bit of the significand. Note that if the position of the decimal point of the operand OP3 is same as the position of the decimal point of the product OP1F*OP2F, bit shifting of the significand OP3F by the shifter 120 is not performed.

Figure 6:
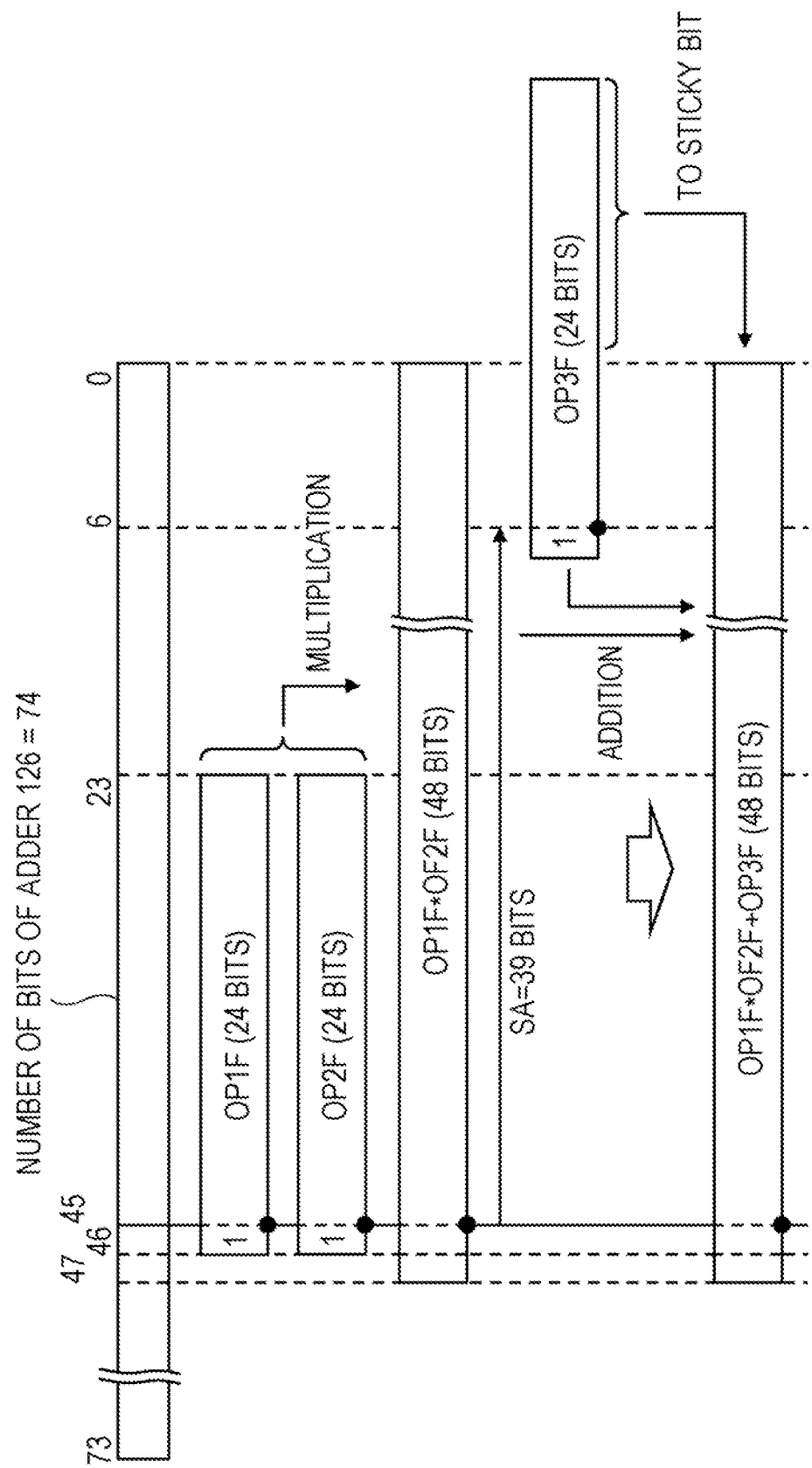
FIG. 6 is a view of another example of the multiply-add operation by the multiply-add computing unit in FIG. 4.

FIG. 6 illustrates another example of a multiply-add operation by the multiply-add computing unit 100 of FIG. 4. Detailed description of same content as the description of FIG. 5 is omitted. In FIG. 6, the position of the decimal point of the operand OP3 is on a lower-order side by 39 bits than the position of the decimal point of the product OP1F*OP2F. In this case, based on the difference DIFE, the shifter 120 right-shifts the significand OP3F by 39 bits to perform alignment with the product OP1F*OP2F. More specifically, a shift amount SA of the significand OP3F is set to 39 bits.

If the significand OP3F is right-shifted by 39 bits, 16 bits on the lower-order side of the significand OP3F go out of the bit width of the adder 126. The adder 126 adds up the product OP1F*OP2F and 8 high-order bits of the significand OP3F. The 16 bits on the low-order side of the significand OP3F are generalized as the sticky bit. S when the significand OP4F (24 bits) is generated from the multiply-add operation result (OP1F*OP2F+OP3F).

Figure 7:
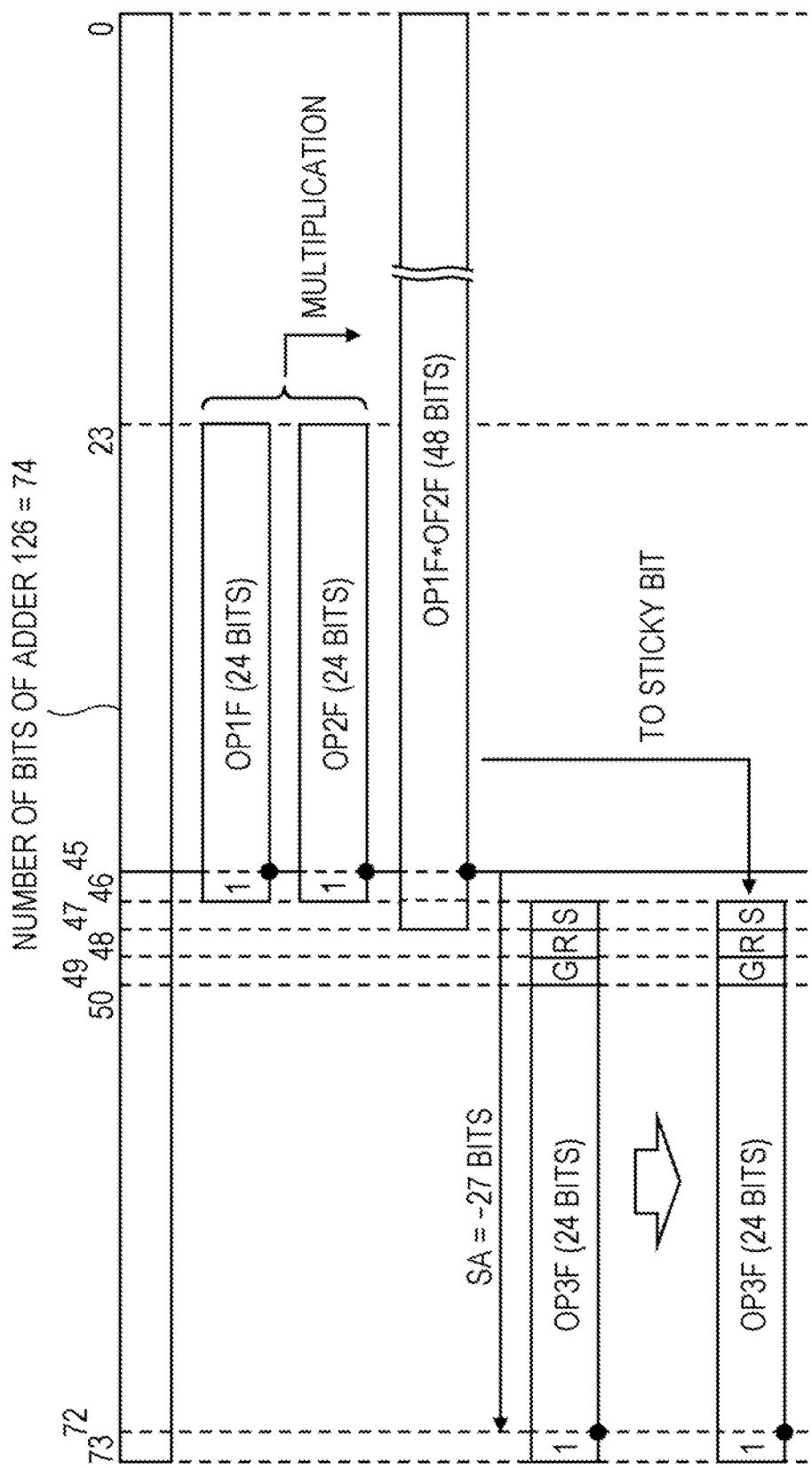
FIG. 7 is a view of another example of the multiply-add operation by the multiply-add computing unit in FIG. 4.

FIG. 7 illustrates another example of a multiply-add operation by the multiply-add computing unit 100 of FIG. 4. Detailed description of same content as the description of FIGS. 5 and 6 is omitted. In this example, the position of the decimal point of the operand OP3 is set on a higher-order side by 27 bits than the position of the decimal point of the product OP1F*OP2F. In this case, based on the difference DIFE, the shifter 120 left-shifts the significand OP3F by 27 bits to perform the alignment with the product OP1F*OP2F. More specifically, the shift amount SA of the significand OP3F is set to −27 bits.

In FIG. 7, since the most significant bit of the product OP1F*OP2F is at the same position as the sticky bit of the significand OP3F after the multiply-add operation, the product OP1F*OP2F of the significand is integrated as the sticky bit. Note that if the least significant bit of the significand OP3F (sticky bit, for example) is located on the higher-order side than the most significant bit of the product OP1F*OP2F, saturation processing of limiting the shift amount SA of the significand OP3F to −27 bits is performed. Consequently, the bit position in the adder 126 of the significand OP3F is same as FIG. 7. The saturation processing of limiting the shift amount SA and fitting the significand OP3F to the bit width of the adder 126 is performed by the subtractor 114 or the shifter 120.

Figure 8:
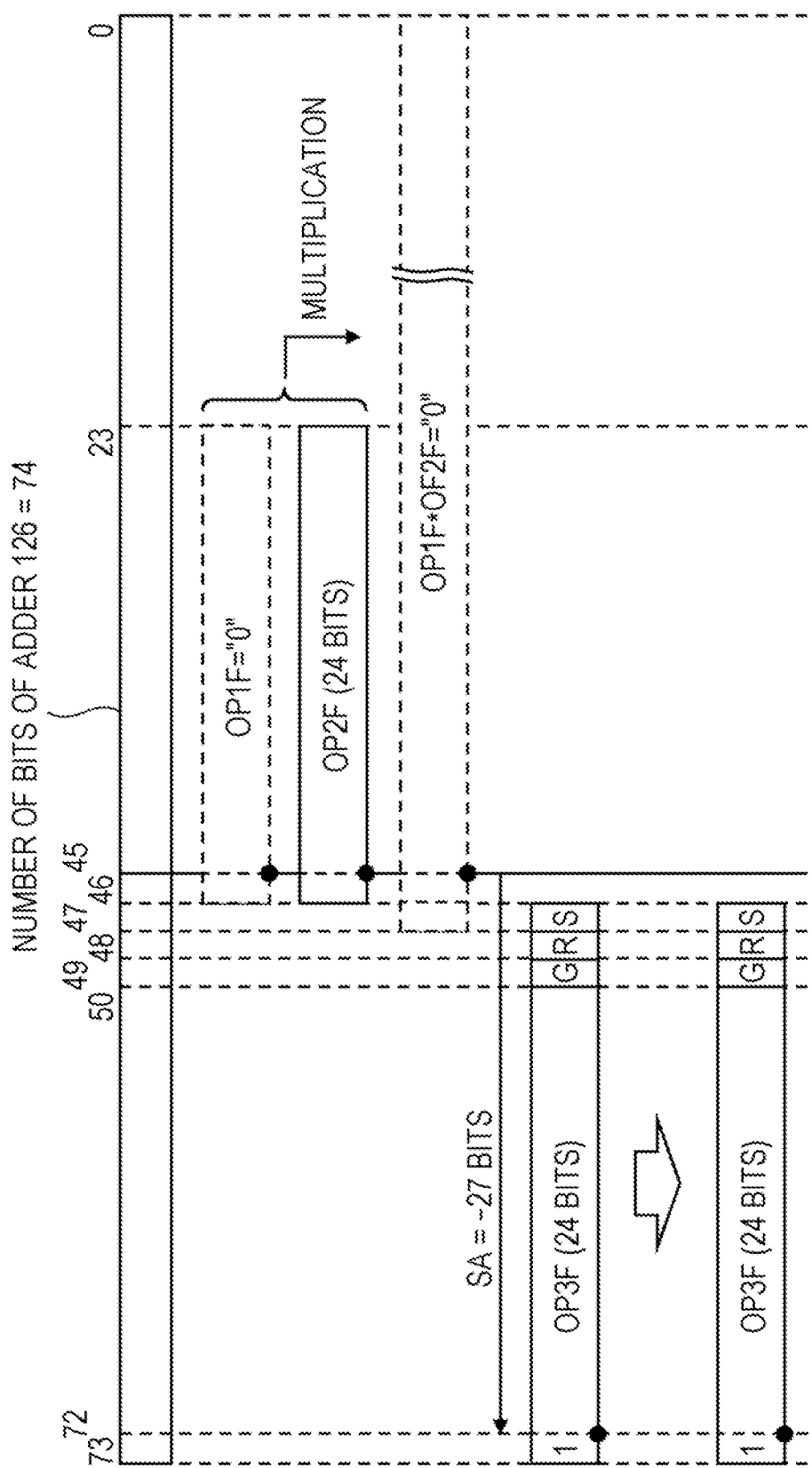
FIG. 8 is a view of another example of the multiply-add operation by the multiply-add computing unit in FIG. 4.

FIG. 8 illustrates another example of a multiply-add operation by the multiply-add computing unit 100 of FIG. 4. Detailed description of same content as the description of FIGS. 5 to 7 is omitted. In this example, the operand OP1 is set to zero.

If any or both of the operands OP1 and OP2 is or are zero, the selectors 108 and 110 select "1" instead of the operands ONE and OP2E, based on the detection result of the zero detector 102 or the zero detector 104 of FIG. 4. Consequently, the adder 112 outputs "−125", and the subtractor 114 outputs the difference DIFE of "−126" even when the operand OP3E is of a minimum value (="1"). The shifter 120 saturation-processes the difference DIFE and left-shifts the significand OP3F by 27 bits.

Since the product OP1F*OP2F is zero, the sum of the significand OP3F and the product OP1F*OP2F is the significand OP3F. Then, the significand OP3F is outputted as the significand OP4F. Consequently, by changing the exponents OP1E and OP2E so that a relation of the significand OP3F and the product OP1F*OP2F reaches a state of FIG. 8, the significand OP3F may be outputted as the significand OP4F of the operand OP4, without provision of the circuits that each operate depending on whether or not the significands OP1F and OP2F are zero. In other words, even if any or both of the operands OP1 and OP2 is or are zero, it is possible to achieve circuit operation same as a case in which any or both of the operands OP1 and OP2 is or are not zero.

In this embodiment, the exponents OP1E and OP2E are set to "1". A shift amount preSA before the saturation processing if the exponents ONE and OP2E are set to "1" is expressed by expression (2) if the exponent OP3E is set to the minimum value "1". Values in the square brackets in the expression represents values of respective parameters.

$$\text{preSA}=(OP1E[1]+OP2E[1])-\text{bias }[127]-OP3E[1]=-126 \quad (2)$$

Note that in IEEE 754, "1" of the exponents OP1E, OP2E, and OP3E represents "−126th power".

Since the shift amount preSA (=−126) is smaller than "−27", the actual shift amount SA is set to "−27" by the saturation processing. This allows the relation of the significand OP3F and the product OP1F*OP2F to reach the state of FIG. 8, by setting the exponents OP1E and OP2E to "1" if any or both of the operands OP1 and OP2 is or are zero, and allows output of the significand OP3F as the OP4F of the operand OP4.

Note that the shift amount SA=−27 is determined from the sum of 23-bit significand, the hidden bit, the guard bit G, the round bit R, and 1 bit in the second place of the integer part of the product OP1F*OP2F (23+1+1+1+1).

Meantime, the exponents OP1E and OP2E to be set in the case where any or both of the operands OP1 and OP2 are zero may be any number other than "1", if the shift amount SA may be set to "−27" or lower, Expressions (3) and (4) illustrate an example of determining the sum of the exponents OP1E+OP2E that makes the shift amount preSA "—27" or lower, based on expression (2). Similarly to expression (2), the exponent OP3E is set to the minimum value (="1").

$$\text{preSA}[-27]\geq(OP1E+OP2E)-\text{bias }[127]-OP3E[1] \quad (3)$$

$$OP1E+OP2E\leq-27+127+1=101 \quad (4)$$

From expression (4), the single-precision multiply-add computing unit 100 allows the relation of the product of the significands OP1F*OP2F and the significand OP3F to reach the same state as FIG. 8, by setting the sum of the exponents OP1E+OP2E to 101 or lower, irrespective of the value of the exponent OP3E.

Expression (5) and expression (6) illustrate an example of making expression (4) applicable to the half precision and the double precision, as well as to the single precision.

$$OP1E+OP2E \leq \text{bias}+1-(n+3) \qquad (5)$$

$$OP1E+OP2E \leq \text{bias}-(W1-W2) \qquad (6)$$

In expression (5), "n" is the bit width of the significand including the hidden bit. In expression (6), "W1" is the bit width that the adder 126 uses for operations, and "W2" is the bit width including the hidden bit of the product OP1F*OP2F.

This makes it possible to output the operand OP3 as the operand OP4 without provision of the bypass circuit and the selector of the exponent OP3E and the significand OP3E in the multiply-add computing unit 100, if any or both of the operands OP1 and OP2 is or are zero. More specifically, if it is detected that any or both of the operands OP1 and OP2 is or are zero and the operand OP3 is outputted as the operand OP4, the increase of the circuit size of the multiply-add computing unit 100 may be suppressed.

Figure 9:
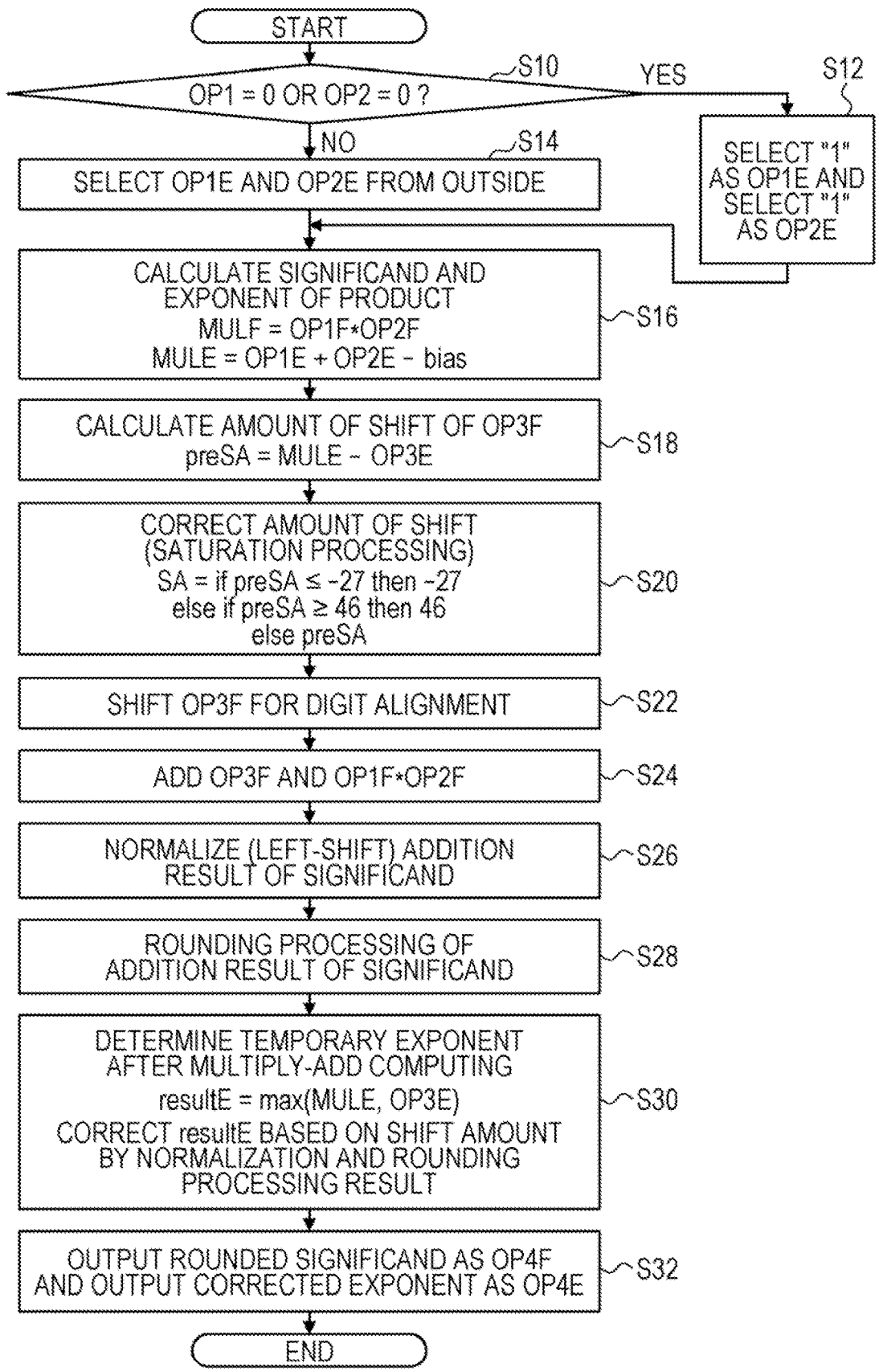
FIG. 9 is a view of an example of an operation flow of the multiply-add computing unit in FIG. 4.

FIG. 9 illustrates an example of an operation flow of the multiply-add computing unit 100 of FIG. 4. More specifically, FIG. 9 illustrates an example of the processor 203 (arithmetic processing device). An operation illustrated in FIG. 9 is started based on issuance of a multiply-add operation instruction of a floating-point number to the multiply-add computing unit 100. Some of processing of the operation illustrated in FIG. 9 may be performed in parallel. In addition, although special processing is desirable if any of the operands OP1, OP2, and OP3 is infinity or not-a-number, description of operation of the special processing is omitted.

First, in step S10, the multiply-add computing unit 100 detects whether or not the operand OP1 is zero, and whether or not the operand OP2 is zero. The multiply-add computing unit 100 judges whether or not any or both of the operands OP1 and OP2 is or are zero. The multiply-add computing unit 100 advances the operation to step S12 if any or both of the operands OP1 and OP2 is or are zero, and advances the operation to step S14 if both of the operands OP1 and OP2 are non-zero. The detection of zero of the operands OP1 and OP2 is performed by the zero detectors 102 and 104, for example.

Next, in step S12, the multiply-add computing unit 100 selects "1" as the exponent OP1E instead of an exponent OP1E received from outside, and outputs "1" to the adder 112. In addition, the multiply-add computing unit 100 selects "1" as the exponent OP2E instead of an exponent OP2E received from outside and outputs "1" to the adder 112. After step S12, the operation shifts to step S16.

In step S14, the multiply-add computing unit 100 selects the exponent OP1E received from outside to the adder 112, selects the exponent OPZE received from outside to the adder 112, and advances the operation to step S16. The operations in step S12 and S14 are performed by the OR gate 106 and the selectors 108 and 110, for example.

In step S16, the multiply-add computing unit 100 calculates a significand product MULF in the product operation and an exponent product MULE of the operands OP1 and OP2, and advances the operation to step S18. The significand product MULF is determined by multiplying the significands OP1F and OP2F, and the exponent product MULE is determined by subtracting a bias from the sum of the exponents OP1E and OP2E. The bias is "127" in the case of the single precision, "1023" in the case of the double precision, and "15" in the case of the half precision. For example, the significand product MULF is calculated by the booth encoder 122 and the partial product adder circuit 124, and the exponent product MULE is calculated by the adder 112.

In step S18, the multiply-add computing unit 100 calculates the shift amount preSA of the significand OP3F to perform alignment of significand, and advances the operation to step S20. The shift amount preSA is a computational shift amount before the saturation processing. For example, the subtractor 114 calculates the shift amount preSA by subtracting the exponent OP3E from the exponent product MULE.

In step S20, the multiply-add computing unit 100 performs correction (saturation processing) that adjusts the shift amount preSA to a bit range of the adder 126, determines the shift amount SA, and advances the operation to step S22. This sets the shift amount preSA, which is smaller than "−27", to the shift amount SA="27", in the case of the single precision. In addition, this makes the shift amount preSA, which is larger than "46", to the shift amount SA="46". For example, the saturation processing is performed after subtraction by the subtractor 114 or before shifting by the shifter 120.

In step S22, the multiply-add computing unit 100 performs alignment of the significands OP1F and OP2F by using the shift amount. SA calculated in step S20 and shifting the bits of the significand OP3F, and advances the operation to step S24. For example, the operation of step S22 is performed by the shifter 120.

In step S24, the multiply-add computing unit 100 adds up the aligned significand OP3F and the multiplication result of the significands OP1F and OP2F, and advances the operation to step S26. For example, the operation in step S24 is performed by the adder 126.

In step S26, the multiply-add computing unit 100 left-shifts to normalize the addition result of the significand in step S24 according to the IEEE 754, and advances the operation to step S28. For example, the operation of step S26 is performed by using, for example, the left-shifter 128 and the leading zero circuit not illustrated in FIG. 4, or the like.

In step S28, the multiply-add computing unit 100 determines the significand after the multiply-add operation by performing the rounding processing of the addition result of the significand normalized in step S26, and advances the operation to step S30. For example, the operation of step S28 is performed by the rounding circuit 130.

In step S30, the multiply-add computing unit 100 selects, as a temporary exponent resultE after the multiply-add operation, whichever is larger of the exponent. OP3F and the exponent product MULE. In addition, the multiply-add computing unit 100 corrects the temporary exponent resultE based on the shift amount by the normalization in step S26 and the result of the rounding processing in step S28, and advances the operation to step S32. For example, the operation of step S30 is performed by the selector 116 and the exponent correction circuit 118.

Then, in step S32, the multiply-add computing unit 100 outputs, as the significand OP4F, the significand obtained by the rounding processing in step S28, outputs, as the exponent OP4E, the exponent obtained by the correction processing in step S30, and terminates the operation.

Figure 10:
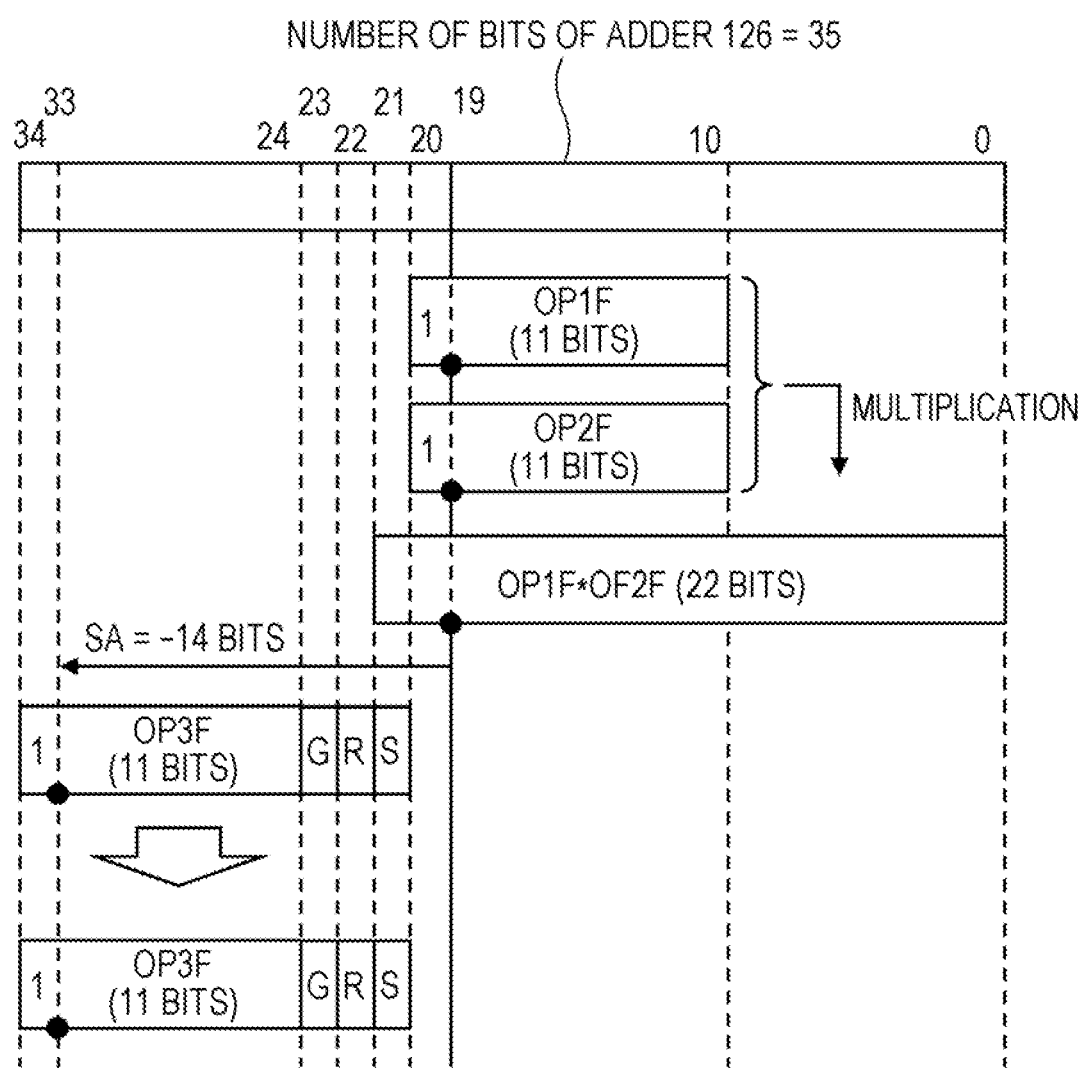
FIG. 10 is a view of an example of a multiply-add operation if the multiply-add computing unit in FIG. 4 is of half precision.

FIG. 10 illustrates an example of a multiply-add operation if the multiply-add computing unit 100 in FIG. 4 is of the half precision. Detailed description of same content as the description of FIGS. 5 to 8 is omitted.

If the multiply-add computing unit 100 is of the half precision, the adder 126 has a width of 35 bits. In the case of the half precision, the significand OP1F, OP2F, and OP3F including the hidden bit "1" is 11-bit and the product OP1F*OP2F is 22-bit. Consequently, the position (filled circle) of the decimal point is set between the 20th bit and 19th bit, so that the product OP1F*OP2F fits in the bit width of the adder 126.

In the example illustrated in FIG. 10, the position of the decimal point of the operand OP3 is set on a higher-order side by 14 bits than the position of the decimal point of the product OP1F*OP2F. In this case, the shifter 120 left-shifts the significand OP3F by 14 bits based on the difference DIFE and performs alignment with the product OP1F*OP2F. More specifically, the shift amount SA of the significand OP3F is set to −14 bits. Note that the shift amount SA=−14 is determined from the sum of the significand of 10 bits, the hidden bit, the guard bit G, the round bit, and 1 bit in the second place of the integer part of the product OP1F*OP2F (10+1+1+1+1).

As illustrated in FIG. 10, the exponents OP1E and OP2E to be set if any or both of the operands OP1 and OP2 is or are zero may make the shift amount SA "−14" or lower. Expressions (7) and (8) illustrate an example of determining the sum of the exponents OP1E+OP2E that makes the shift amount preSA "−14" or lower, based on expression (2). The exponent OP3E is set to the minimum value of "1", similarly to expression (2). Note that the bias in the case of the half precision is "15".

$$\text{preSA}[-14] \geq (OP1E+OP2E)-\text{bias}[15]-OP3E[1] \quad (7)$$

$$OP1E+OP2E \leq -14+15+1=2 \quad (8)$$

If the sum of the exponents OP1E+OP2E is "2" or lower, expression (8) allows a relation of the product of the significands OP1F*OP2F and the significand OP3F to reach the same state as the state of FIG. 10, irrespective of the value of the exponent OP3E. As illustrated in FIG. 4, by setting the set value selected by the selectors 108 and 110 to "1", the set value may be made common to the multiply-add computing units 100 in the half precision, the single precision, and the double precision, and design assets may be diverted.

Figure 11:
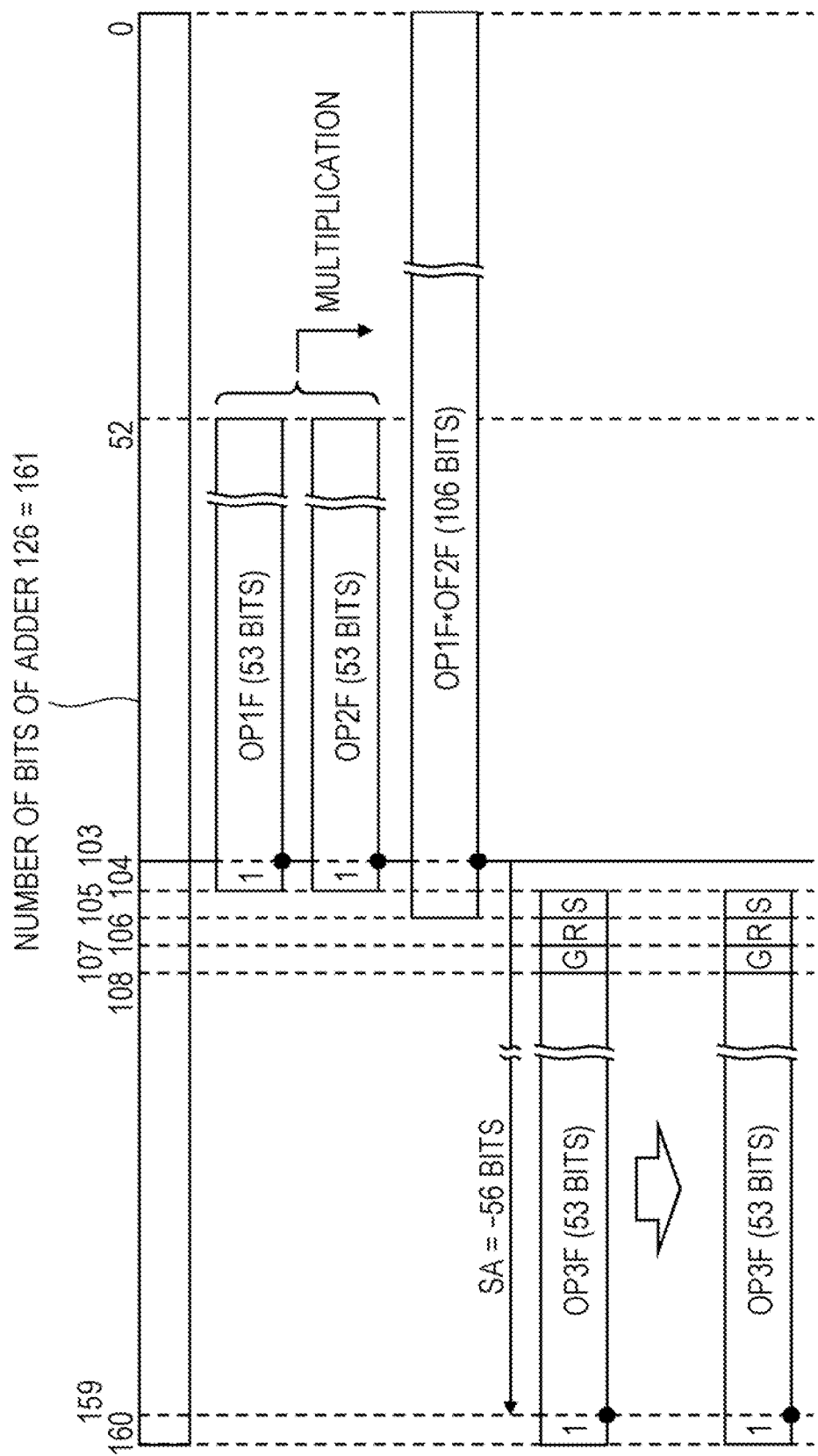
FIG. 11 is a view of an example of a multiply-add operation if the multiply-add computing unit of FIG. 4 is of double precision.

FIG. 11 illustrates an example of the multiply-add operation if the multiply-add computing unit 100 of FIG. 4 is of the double precision. Detailed description of same content as the description of FIGS. 5 to 8 is omitted.

If the multiply-add computing unit 100 is of the double precision, the adder 126 has a width of 161 bits. In the case of the double precision, the significand OP1F, OP4, and OP3F including the hidden bit "1" is 53-bit, and the product OP1F*OP2F is 106-bit. Consequently, the position of the decimal point (filled circle) is set between the 104th bit and the 103rd bit, so that the product OP1F*OP2F fits in the bit width of the adder 126.

In the example illustrated in FIG. 11, the position of the decimal point of the operand OP3 is set on a higher-order side by 56 bits than the position of the decimal point of the product OP1F*OP2F. In this case, the shifter 120 left-shifts the significand OP3F by 56 bits based on the difference DIFF, and performs alignment with the product OP1F+OP2F. More specifically, the shift amount SA of the significand OP3F is set to −56 bits. Note that the shift amount SA=−56 is determined from the sum of the significand of 52 bits, the hidden bit, the guard bit G, the round bit R, and 1 bit in the second place of the integer part of the product OP1F*OP2F (52+1+1+1+1).

As illustrated in FIG. 11, the exponents OP1E and OP2E to be set if any or both of the operands OP1 and OP2 is or are zero may make the shift amount SA "−56" or lower, Expressions (9) and (10) illustrate an example of determining the sum of the exponents OP1E+OP2E that make the shift amount preSA "−56" or lower, based on expression (2). The exponent OP3E is set to the minimum value of "1", similarly to expression (2). Note that the bias in the case of the half precision is "1023".

$$\text{preSA}[-56] \geq (OP1E+OP2E)-\text{bias}[1023]-OP3E[1] \quad (9)$$

$$OP1E+OP2E \leq -56+1023+1=968 \quad (10)$$

From expression (10), if the sum of the exponents OP1E+OP2E is "968" or lower, a relation of the product of the significands OP1F*OP2F and the significand OP3F may reach the same state as the state of FIG. 11, irrespective of the value of the exponent OP3E.

Figure 12:
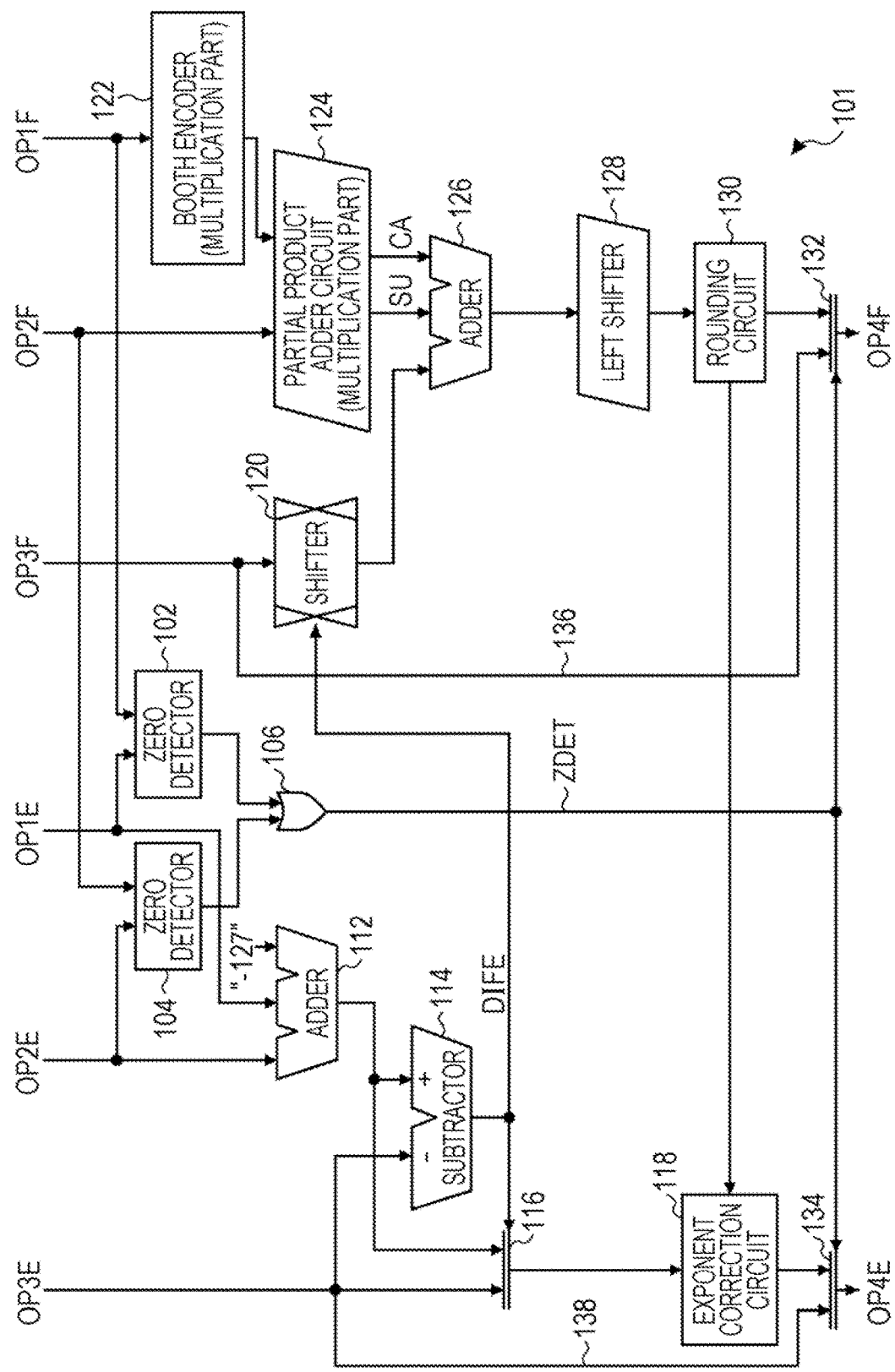
FIG. 12 is a view of an example of other floating point multiply-add computing unit.

FIG. 12 illustrates an example of other floating point multiply-add computing unit. Same numerals are assigned to elements same as FIG. 4, and detailed description is omitted.

A multiply-add computing unit 101 illustrated in FIG. 12 has the zero detectors 102 and 104, the OR gate 106, the adder 112, the subtractor 114, the selector 116, and the exponent correction circuit 118. In addition, the multiply-add computing unit 101 also has the shifter 120, the booth encoder 122, the partial product adder circuit 124, the adder 126, the left-shifter 128, the rounding circuit 130, selectors 132 and 134, and bypass paths 136 and 138.

In the multiply-add computing unit 101, the adder 112 directly receives the exponents OP1E and OP2E, and output of the OR gate 106 is coupled to control input of the selectors 132 and 134. The bypass path 136 conveys the significand OP3F to the selector 132, and the bypass path 138 conveys the exponent OP3E to the selector 134.

When the selector 132 receives the zero detection signal ZDET of the logic 0 from the OR gate 106, the selector 132 selects output of the rounding circuit 130, and outputs the output as the significand OP4F. When the selector 132 receives the zero detection signal ZDET of the logic 1, the selector 132 selects the significand OP3F to be conveyed to the bypass path 136, and outputs the significand OP3F as the significand OP4F. When the selector 134 receives the zero detection signal ZDET of the logic 0 from the OR gate 106, the selector 134 selects the output of the exponent correction circuit 118, and outputs the output as the exponent OP4E. If the selector 134 receives the zero detection signal ZDET of the logic 1, the selector 134 selects the exponent OP3E to be conveyed to the bypass path 138, and outputs the exponent OP3E as the exponent OP4E.

With this, the multiply-add computing unit 101 uses the bypass paths 136 and 138 and outputs the operand OP3 (exponent. OP3E and significand OP3F) as the operand OP4 (exponent OP4E and significand OP4F), if any or both of the operands OP1 and OP2 is or are zero. However, in the multiply-add computing unit 101 illustrated in FIG. 12, in the case of the single precision, the 8-bit bypass path 138 for the exponent OP3E and the 23-bit bypass path 136 for the significand OP3F are provided. In practice, since a bypass path of a signed bit is also provided, a 32-bit bypass path is wired from the input side of the operand OP3 to the output side of the operand OP4.

In addition, the selector 132 selects any input of two inputs of 23 bits, and the selector 134 selects any input of two inputs of 8 bits. In practice, a selector of the signed bit is also provided. In contrast, each of the selectors 108 and 110 illustrated in FIG. 4 may have only to select any input of the two inputs of 8 bits. Consequently, the multiply-add computing unit 101 has to include the bypass paths 136 and 138, and a selector layout area for 16 bits, as compared with the multiply-add computing unit 100 illustrated in FIG. 4.

As described above, as compared to the multiply-add computing unit 101, the multiply-add computing unit 100 illustrated in FIG. 4 may reduce the circuit size, thus being able to suppress the increase of the circuit size of the processor 203. For example, as illustrated in FIG. 3, if the processor 203 has a multitude of the multiply-add computing units 100, the effect of reducing the circuit size is profound, and the effect of reducing chip size of the processor 203 is profound. This makes it possible to cut down manufacturing cost of the information processor 300 as compared to a case in which the multiply-add computing unit 101 illustrated in FIG. 12 is adopted.

In addition, in the multiply-add computing units 100 and 101, an arithmetic path of the significand OP1F, OP2F, and OP3F includes the booth encoder 122, the partial product adder circuit 124, the adder 126, the left shifter 128, and the rounding circuit 130, which are arranged in series. An arithmetic circuit of the significand OP1F, OP2F, and OP3F has larger size than an arithmetic circuit of the exponents OP1F, OP2E, and OP3E, and operation time of the significand OP1F, OP2F, and OP3F increases as compared to the operation time of the exponents OP1E, OP2E, and OP3E. More specifically, the arithmetic circuit of the significand OP1F, OP2F, and OP3F is a bottleneck of the operation time of the multiply-add computing units 100 and 101.

If the selector 132 is added to the arithmetic path that is the bottleneck, the operation time of a multiply-add operation is longer and performance of the multiply-add computing unit 101 degrades. In the multiply-add computing unit 100 illustrated in FIG. 4, since no circuit such as a selector is added to the arithmetic path of the significand OP1F, OP2F, and OP3F, which is the bottleneck, the increase of the operation time may be suppressed and degradation of the performance of the multiply-add computing unit 100 may be suppressed.

As described above, even in the embodiment illustrated in FIGS. 4 to 11, the effect similar to the effect of the embodiment illustrated in FIGS. 1 and 2 may be achieved. More specifically, if it is detected that any or both of the operands OP1 and OP2 is or are zero and the operand OP3 is outputted as the operand OP4, the increase of the circuit size of the multiply-add computing unit 100 may be suppressed.

The effect of suppressing the increase of the circuit size is higher as the number of the multiply-add computing units 100 included in the processor 203 is larger. If the increase of the chip size of the processor 203 may be suppressed, the manufacturing cost of the information processor 300 may be reduced.

Furthermore, in the embodiment illustrated in FIGS. 4 to 11, if any or both of the operands OP1 and OP2 is or are zero, the operand OP3 may be outputted as the operand OP4 without addition of the circuit such as the selector to the arithmetic path that is the bottleneck of the operation time. This may suppress the increase of the operation time of the multiply-add operation and the degradation of the performance of the multiply-add computing unit 100 may be suppressed.

Setting a set value to be selected by the selectors 108 and 110 to "1" make the set value common to the multiply-add computing unit 100 of the half precision, the single precision, and the double precision, thus allowing for diversion of the design assets.

The characteristics and advantages of the embodiments become apparent from the above detailed description. It is intended that the claims cover the characteristics and advantages of the aforementioned embodiments as far as the claims do not depart from the spirit and scope of rights. In addition, an ordinary skilled person in the art in the technical field may easily conceive any improvements or changes. Therefore, it is not intended that the scope of the embodiments having inventiveness be limited to the aforementioned embodiments, and it is possible to be based on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
   a zero detection circuit that detects that at least one of a first operand and a second operand included in a multiply-add operation instruction is zero;
   an exponent setting circuit that sets an exponent of the first operand to a first set value and sets an exponent of the second operand to a second set value, when the zero detection circuit detects the zero;
   an exponent calculation circuit that calculates an exponent to be obtained by a multiply-add operation, based on the exponent of the first operand and the exponent of the second operand outputted by the exponent setting circuit and an exponent of a third operand included in the multiply-add operation instruction;
   a multiplication circuit that calculates a product of a significand of the first operand and a significand of the second operand; and
   an addition circuit that adds the product calculated by the multiplication circuit and a significand of the third operand that is aligned, a sum of the first set value and the second set value being set so that a bit position of the third operand is located on a higher-order bit side than a most significant bit of the product of the first operand and the second operand.

2. The arithmetic processing device according to claim 1, wherein when the addition circuit executes an operation using a predetermined number of additional bits located in a lower-order bit side than a least significant bit of each of the significands, the sum of the first set value and the second set value is set so that the least significant bit of the additional bits appended to a significand of the third operand is at the same position as the most significant bit of the product of the first operand and the second operand or on a higher-order bit side than the most significant bit.

3. The arithmetic processing device according to claim 1, wherein the sum of the first set value and the second set value is set to "bias+1−(n+3)" or lower, where bias denotes a bias of the exponent and n denotes a bit width of the significand.

4. The arithmetic processing device according to claim 1, wherein the sum of the first set value and the second set value is set to "bias−(W1−W2)" or lower, where bias denotes a bias of the exponent, W1 denotes a bit width that the addition circuit uses in the multiply-add operation, and W2 denotes a bit width of the product of the first operand and the second operand.

5. The arithmetic processing device according to claim 1, wherein the first set value and the second set value are both set to "1".

6. The arithmetic processing device according to claim 1, wherein
the exponent setting circuit includes:
a first selector that selects the exponent of the first operand when the zero detection circuit detects non-zero of both the first operand and the second operand, and selects the first set value as the exponent of the first operand when the zero detection circuit detects the zero; and
a second selector that selects the exponent of the second operand when the zero detection circuit detects the non-zero of both the first operand and the second operand, and selects the second set value as the exponent of the second operand when the zero detection circuit detects zero, and
the exponent calculation circuit includes:
an adder that adds the exponent of the first operand outputted by the first selector and the exponent of the second operand outputted by the second selector; and
a third selector that selects an addition result outputted from the adder or the exponent of the third operand as an exponent obtained by the multiply-add operation based on a comparison of the addition result and the exponent of the third operand.

7. The arithmetic processing device according to claim 1, wherein the first operand, the second operand, and the third operand are expressed in a binary floating-point format of Institute of Electrical and Electronics Engineers (IEEE) 754.

8. An arithmetic processing device comprising:
a zero detection circuit configured to receive a first operand and a second operand included in a multiply-add operation, to detect that at least one of the first operand and the second operand is zero, and to provide a zero detection output signal;
an exponent setting circuit configured to receive the zero detection signal from the zero detection circuit and to set an exponent of the first operand and an exponent of the second operand based on the received zero detection signal;
an exponent calculation circuit configured to calculate an exponent to be obtained by a multiply-add operation, based on the exponent of the first operand and the exponent of the second operand outputted by the exponent setting circuit and an exponent of a third operand included in the multiply-add operation instruction;
a multiplication circuit configured to calculate a product of a significand of the first operand and a significand of the second operand;
an alignment circuit configured to align digits of the product calculated and the third operand; and
an addition circuit configured to add the product calculated by the multiplication circuit and a significand of the third operand that are aligned by the alignment circuit.

9. The arithmetic processing device according to claim 8, wherein the zero detection signal is only provided to the exponent setting circuit.

10. The arithmetic device according to claim 8, wherein
the exponent setting circuit sets an exponent of the first operand to a first set value and sets an exponent of the second operand to a second set value when zero detection signal indicates that at least one of the first operand and second operand is zero; and
a sum of the first set value and the second set value are set so that a bit position of the third operand is located on a higher-order bit side than the most significant bit of the product of the first operand and the second operand.

* * * * *